United States Patent
Kaida et al.

(10) Patent No.: US 9,274,371 B2
(45) Date of Patent: Mar. 1, 2016

(54) COLOR CONVERSION SUBSTRATE, METHOD FOR MANUFACTURING SAME, AND DISPLAY DEVICE

(71) Applicant: Sharp Kabushiki Kaisha, Osaka (JP)

(72) Inventors: Kazuya Kaida, Osaka (JP); Shinya Kadowaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/399,734

(22) PCT Filed: May 15, 2013

(86) PCT No.: PCT/JP2013/063513
§ 371 (c)(1),
(2) Date: Nov. 7, 2014

(87) PCT Pub. No.: WO2013/172373
PCT Pub. Date: Nov. 21, 2013

(65) Prior Publication Data
US 2015/0131029 A1    May 14, 2015

(30) Foreign Application Priority Data

May 16, 2012  (JP) ................. 2012-112257

(51) Int. Cl.
*G02F 1/1335* (2006.01)
*G02B 5/20* (2006.01)

(52) U.S. Cl.
CPC .............. *G02F 1/1336* (2013.01); *G02B 5/201* (2013.01); *G02F 1/133512* (2013.01); *G02F 1/133617* (2013.01); *G02F 1/133553* (2013.01); *G02F 2001/133562* (2013.01); *G02F 2001/133614* (2013.01)

(58) Field of Classification Search
CPC ............ G02F 1/1336; G02F 1/133512; G02F 1/133617; G02F 2001/133614; G02B 5/201
See application file for complete search history.

(56) References Cited

U.S. PATENT DOCUMENTS 6,855,196 B2 * 2/2005 Kawamura ............ C09D 11/30
106/31.6

FOREIGN PATENT DOCUMENTS

JP    2010-66437 A    3/2010

* cited by examiner

*Primary Examiner* — Richard Kim
*Assistant Examiner* — Kendrick Hsu
(74) *Attorney, Agent, or Firm* — Chen Yoshimura LLP

(57) ABSTRACT

A color conversion substrate that can improve light use efficiency is provided. A color conversion substrate includes a transparent substrate having a main surface, a plurality of phosphor patterns arranged on the main surface and each of the phosphor patterns having side faces, and a reflective film that reflects light and is formed on at least the side faces of the phosphor patterns. An air layer is defined between the main surface and the phosphor patterns.

17 Claims, 13 Drawing Sheets

COLOR CONVERSION SUBSTRATE, METHOD FOR MANUFACTURING SAME, AND DISPLAY DEVICE

TECHNICAL FIELD

The present invention relates to a color conversion substrate, a method of manufacturing the color conversion substrate, and a display device equipped with the color conversion substrate.

BACKGROUND ART

It has conventionally been proposed for one type of display device to have a backlight that emits blue light, a liquid crystal panel, and a phosphor substrate. This phosphor substrate has phosphors that absorb blue light and emit red light and phosphors that absorb blue light and emit green light. Blue light is displayed by passing through a blue color filter, but the light source is originally blue, and thus there is almost no light loss due to the blue color filter. Therefore, the light loss due to absorption by the color filter is eliminated and light use efficiency is improved.

Japanese Patent Application Laid-Open Publication No. 2010-66437 (Patent Document 1) discloses a configuration in which a reflective plate is provided on side faces of phosphors disposed on a front plate in a liquid crystal display device in order to improve efficiency by retrieving light from the phosphors. The configuration described in Patent Document 1 is shown in FIG. 32. A red phosphor pattern 3r, a green phosphor pattern 3g, and a diffusion layer 3b are formed on one surface of a transparent substrate 1. A light shutter 42 is disposed so as to overlap this surface.

RELATED ART DOCUMENT

Patent Document

Patent Document 1: Japanese Patent Application Laid-Open Publication No. 2010-66437

SUMMARY OF THE INVENTION

Problems to be Solved by the Invention

With respect to the structure shown in FIG. 32, a scenario is shown in FIG. 33 when blue light 4b enters from below as light from the backlight. The blue light 4b excites the red phosphor pattern 3r and the green phosphor pattern 3g and causes red light 5r and green light 5g to be respectively emitted upwards from the transparent substrate 1. The blue light 4b that enters the diffusion layer 3b is scattered and emitted upwards from the transparent substrate 1.

As described in paragraph [0029] in Patent Document 1, if the refractive index of the phosphors is 1.5, then when light that has been emitted from the phosphors passes through the inside of the glass substrate and travels towards outside of the viewing side, this light will be totally reflected at the interface of the glass substrate and the outside atmosphere according to Snell's law if the angle at which the light is incident on this interface is at least a critical angle. This is shown in FIG. 33. As a result, light is not able to be omitted to outside of the viewing side, thereby not contributing to display, being lost, and lowering light use efficiency.

A portion of the light that is emitted from inside the glass substrate towards outside of the viewing side and then totally reflected at the interface of the glass substrate and the outer atmosphere may be incident on other adjacent phosphors and excite these phosphors. If these phosphors are excited in this manner, the unnecessary light emitted therefrom will lead to degradation of display quality.

Among the light emitted by excitation of the phosphors, the light that is progressing towards the light sources instead of the viewing side will pass through a transparent resin layer 23 and be lost and not contribute to display due to the refractive index of the phosphor patterns 3r and 3g being close to that of the transparent resin layer 23.

The present invention was made in view of the above-mentioned problems, and a primary aim thereof is to provide a color conversion substrate that can improve light use efficiency, a method of manufacturing this color conversion substrate, and a display device equipped with this color conversion substrate.

Means for Solving the Problems

A color conversion substrate of the present invention includes: a transparent substrate having a main surface; a plurality of phosphor patterns arranged and supported on the main surface of the transparent substrate, such that an air layer is defined therebetween, each of the phosphor patterns having side faces; and a reflective film that reflects light and that is formed on at least the side faces of the phosphor patterns, wherein the main surface of the transparent substrate and the plurality of phosphor patterns are configured such that a surface of each of the phosphor patterns facing the transparent substrate is exposed to the air layer.

It is preferable that the above-mentioned color conversion substrate further include spacers interposed between the main surface of the transparent substrate and peripheries of the phosphor patterns. The spacers may be made of a transparent resin material.

A method of manufacturing a color conversion substrate includes: preparing a transparent substrate having a main surface; forming a plurality of spacers on the main surface of the transparent substrate; forming a sacrificial layer between adjacent pairs of the spacers on the main surface of the transparent substrate; forming phosphor patterns that cover the sacrificial layer and have peripheries thereof that are disposed on the spacers; and removing the sacrificial layer.

In the above-mentioned method of manufacturing a color conversion substrate, it is preferable that the sacrificial layer be made of a material that can be removed by wet etching with an acid or an alkali.

In the above-mentioned method of manufacturing a color conversion substrate, it is preferable that the step of removing the sacrificial layer include defining an air layer between the main surface of the transparent substrate and the phosphor patterns such that a surface of each of the phosphor patterns facing the transparent substrate is exposed to the air layer.

A display device according to the present invention includes: the above-mentioned color conversion substrate; a light source configured to illuminate the color conversion substrate; and a light shutter disposed between the color conversion substrate and the light source, wherein the light shutter supports the color conversion substrate such that an air layer is defined therebetween and such that another of each of the phosphor pattern is exposed to the air layer.

It is preferable that the above-mentioned display device further include spacers interposed between the light shutter and the phosphor patterns so as to correspond to edges of the phosphor patterns. The spacers interposed between the light shitter and the phosphor patterns may form a black matrix The black matrix may be a light-shielding member formed so as to correspond to edges of the plurality of pixels and to be disposed between these pixels. The arrangement pattern (planar shape) of the black matrix is not limited to a matrix, and may be a stripe shape, for example.

Effects of the Invention

Light use efficiency can be improved with the color conversion substrate of the present invention.

DETAILED DESCRIPTION OF EMBODIMENTS

Figure 1:
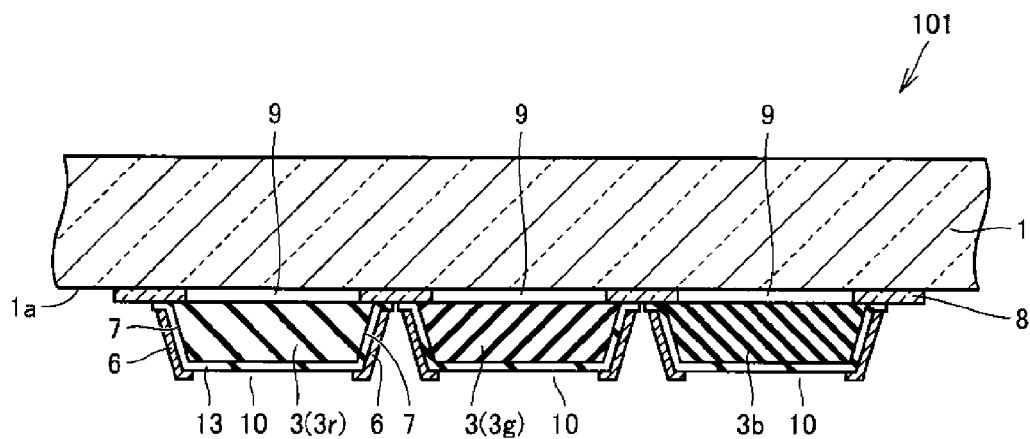
FIG. 1 is a cross-sectional view of a color conversion substrate of Embodiment 1.

Embodiments of the present invention will be explained below with reference to drawings. In the drawings described below, the same reference characters are given to parts that are the same or equivalent, and an explanation thereof will not be repeated.

(Embodiment 1)

FIG. 1 is a cross-sectional view of a color conversion substrate 101 of Embodiment 1. As shown in FIG. 1, the color conversion substrate 101 includes a transparent substrate 1, a plurality of phosphor patterns 3, a protective film 13, and a reflective film 6. The transparent substrate 1 has a main surface 1a. The transparent substrate 1 is a glass substrate or the like, for example. The plurality of phosphor patterns 3 are arranged on the main surface 1a and each have side faces 7. The protective film 13 is formed so as to cover the phosphor patterns 3. The reflective film 6 is formed on at least the side faces 7 of the phosphor patterns 3. The reflective film 6 reflects light that has been emitted from the side faces 7 of the phosphor patterns 3.

The phosphor patterns 3 include a red phosphor pattern 3r and a green phosphor pattern 3g. The red phosphor pattern 3r is formed of a phosphor material that absorbs at least blue light and converts the blue light into red light. The green phosphor pattern 3rg is formed of a phosphor material that absorbs at least blue light and converts the blue light into green light. In addition to the plurality of phosphor patterns 3, a diffusion layer 3b that diffuses blue light is formed on the main surface 1a. The red phosphor pattern 3r, the green phosphor pattern 3g, and the diffusion layer 3b are arranged with gaps therebetween.

The refractive index of the red phosphor pattern 3r and the green phosphor pattern 3g is approximately 1.49 to 1.59. The red phosphor pattern 3r and the green phosphor pattern 3g are formed of an organic phosphor material, a nanophosphor material, or the like.

Examples of the organic phosphor materials include a rhodamine pigment such as rhodamine B that is a red phosphor pigment, a coumarin pigment such as coumarin 6 that is a green phosphor pigment, or the like. The nanophosphor material includes a binder and a plurality of phosphors diffused in the binder. The binder is formed of a resin such as a transparent silicone type, an epoxy type, or an acrylic type, for example. CdSe, ZnS, or the like that is a nanoparticle phosphor can be used as the phosphors, for example.

By forming the red phosphor pattern 3r with the materials above, red light (light having a wavelength region of 530 nm to 690 nm) can pass through the red phosphor pattern 3r. This makes it possible for red light emitted by the phosphor material in the red phosphor pattern 3r becoming excited to pass through the red phosphor pattern 3r itself and allows light use efficiency of the light from the red phosphor pattern 3r to be improved.

In a similar manner, the green phosphor pattern 3g can allow green light (light having a wavelength region of 460 nm to 580 nm) to pass therethrough. This makes it possible for green light emitted by the phosphor material in the green phosphor pattern 3g becoming excited to pass through the green phosphor pattern 3g itself and allows light use efficiency of the light from the green phosphor pattern 3g to be improved.

The diffusion layer 3b is a layer that diffuses light entering therein and then emits the light outside. The diffusion layer 3b may allow blue light to pass therethrough or may scatter the blue light. The diffusion layer 3b has a transparent resin as a binder and a plurality of scattering particles that are scattered in the resin, for example. The transparent resin that is a binder allows blue light to pass through and allows light use efficiency to be improved. Scattering particles having a lower refractive index than the binder, scattering particles having a higher refractive index than the binder, or scattering particles subject to Mie scattering such as TiO2 can be adopted as the scattering particles.

The top in FIG. 1 is the viewing side and the bottom is the light source side. The color conversion substrate 101 is used by light from the backlight entering the substrate from the light source side. Conversely, a method is also possible in which light from the backlight enters from the transparent substrate 1 side and is viewable from the side opposite to the transparent substrate 1.

The protective film 13 covers the red phosphor pattern 3r, the green phosphor pattern 3g, and the diffusion layer 3b and protrudes beyond the phosphor patterns 3 and the diffusion layer 3b towards the light source. The protective film 13 is made of a transparent material such as a silicon oxide film ($SiO_2$) or a silicon nitride film ($Si_xN_y$), for example.

The reflective film 6 is formed to cover the surface of the protective film 13, which covers the side faces 7 of the phosphors 3. The reflective film 6 is formed in a loop shape that surrounds the side faces of the phosphor patterns 3 and the diffusion layer 3b.

A transparent resin material is patterned onto the main surface 1a to form the spacers 8. The spacers 8 are interposed between the main surface 1a of the transparent substrate 1 and the phosphor patterns 3 and the diffusion layer 3b, and the spacers 8 are arranged on the viewing side with respect to the phosphor patterns 3 and the diffusion layer 3b. By providing the spacers 8, air layers 9, which are viewing-side air layers, are respectively defined between the main surface 1a of the transparent substrate 1 and the phosphor patterns 3, and the main surface 1a and the diffusion layer 3b. Air layers 10, which are light source-side air layers, are respectively defined on the light source side of the phosphor patterns 3 and the light source side of the diffusion layer 3b.

The spacers 8 are made of a transparent resin to prevent the reflection of external light. The thickness of the spacers 8 is 0.2 μm to 2 μm. The thickness of the spacers 8 is configured such that the refractive index of the air layers 9 is expressed with ease.

Figure 2:
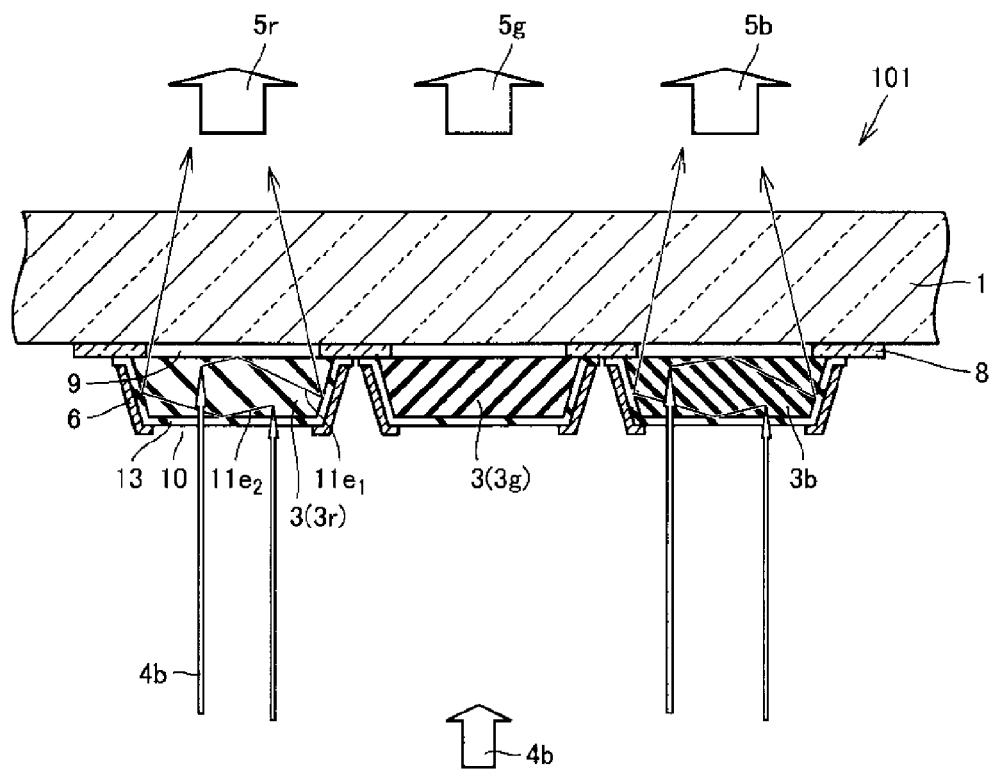
FIG. 2 is a view for explaining a state in which blue light has entered the color conversion substrate of Embodiment 1.

FIG. 2 is a view of a state in which blue light 4b has entered the color conversion substrate 101 of Embodiment 1. FIG. 2 shows a scenario in which the blue light 4b, which is light from the backlight, has entered the color conversion substrate 101 of Embodiment 1. The top in FIG. 2 is the viewing side and the bottom is the light source side. The blue light 4b is emitted from a backlight (not shown) disposed below the color conversion substrate 101.

There are openings in the reflective film 6, which covers the surface of the protective film 13. The openings are formed in the light source side of the phosphor patterns 3 and the diffusion layer 3b. As shown in FIG. 2, the blue light 4b enters the phosphor patterns 3 and the diffusion layer 3b from the openings. At least a portion of the blue light 4b that enters the phosphor patterns 3 is absorbed by the phosphor material in the respective phosphor patterns 3. The blue light 4b being incident on the phosphor material excites the phosphor material. The phosphor material in the red phosphor pattern 3r becomes excited by absorbing the blue light 4b, and then radially emits red light. The phosphor material in the green phosphor pattern 3g becomes excited by absorbing the blue light 4b, and then radially emits green light.

At respective points inside the phosphor patterns 3, non-directional light is emitted. Of the light that is emitted radially when the non-directional light is emitted, the light that progresses at a small incident angle to the interface of the air layers 9 and the phosphor patterns 3 passes through the air layers 9 and the transparent substrate 1 and is emitted towards the viewing side as the red light 5r or the green light 5g.

Due to the non-directional light emitted by excitation of the phosphor patterns 3, light 11e1 that progresses at a large incident angle to the interface of the air layers 9 and the phosphor patterns 3 is totally reflected at this interface and returns to inside of the phosphor patterns 3. After the light progressing at a large incident angle to the interface of the air layer 9 and the phosphor pattern 3 is reflected at least once by the reflective film 6 or the like without exiting the phosphor pattern 3, this light is also emitted towards the viewing side in a manner similar to that described above. If the incident angle is smaller than a certain degree, light can enter the air layer 9, but if the incident angle is larger than a certain degree, then light cannot enter the air layer 9 and is reflected by the interface of the air layer 9 and the phosphor pattern 3 and returns to inside of the phosphor pattern 3.

The light 11e1 reflected at the interface of the air layer 9 and the phosphor pattern 3 progresses towards the side face 7 of the phosphor pattern 3. This light 11e1 that has progressed towards the side face 7 is reflected by the reflective film 6. The light 11e1 that is now progressing towards the viewing side due to being reflected by the reflective film 6 passes through the air layer 9 and the transparent substrate 1 and exits to the viewing side if progressing at a sufficiently small enough incident angle with respect to the interface of the air layer 9 and the phosphor pattern 3.

Due to the non-directional light emitted by excitation of the phosphor patterns 3, among the light progressing towards the light source side that is opposite to the viewing side, light 11e2 that progresses at a large incident angle with respect to the interface of the air layer 10 and the phosphor pattern 3 is totally reflected at this interface and returns to inside of the phosphor pattern 3. After the light progressing at a large incident angle with respect to the interface of the air layer 10 and the phosphor pattern 3 is reflected at least once by the reflective film 6 or the like without exiting the phosphor pattern 3, this light is also emitted towards the viewing side in a manner similar to that described above.

The ability for the light to cross the interface of the air layer 9 and the phosphor pattern 3 and enter the air layer 9 is limited to when the incident angle of the light with respect to the interface of the air layer 9 and the phosphor pattern 3 is smaller than a certain degree. This incident angle of this type of light also naturally becomes sufficiently small at the interface of the transparent substrate 1 and outer atmosphere, and thus can exit towards the viewing side without being reflected at the interface of the transparent substrate 1 and the outer atmosphere. Accordingly, regardless of whether the light has entered inside the air layer 9, it is possible to avoid the light being reflected at the interface of the transparent substrate 1 and the outer atmosphere and then being lost without exiting to the viewing side.

In the color conversion substrate 101 of the present embodiment, the top and bottom of the respective phosphor patterns 3 are sandwiched by the air layers 9 and 10. The air layers 9 and 10 can be said to have a refractive index of 1. The phosphor patterns 3 can be said to have a refractive index of 1.49 to 1.59. The air layers 9 are interposed between the main surface 1a and the phosphor patterns 3, and have a refractive index that is lower than the refractive index of the phosphor patterns 3. The air layers 10 cover the surfaces of the phosphor patterns 3 not covered by the reflective film 6 on the side opposite to the transparent substrate 1, and have a refractive index that is lower than the refractive index of the phosphor patterns 3.

With this configuration, the air layers 9 and 10 have a sufficiently lower refractive index than the phosphor patterns 3; therefore, light being emitted from the phosphor patterns 3 is selected under strict conditions, and all light except for the light with a sufficiently small incident angle can be totally reflected. The light that is totally reflected has the angle thereof changed at the reflective film 6 and is then emitted towards the air layer 9, where this light then passes through the transparent substrate 1, exits towards the display surface, and contributes to display. In this manner, light use efficiency can be improved.

The non-directional blue light 4b is also scattered in the diffusion layer 3b provided separately from the phosphor patterns 3. By sandwiching the top and the bottom of the diffusion layer 3b with the air layers 9 and 10, the light scattered inside the diffusion layer 3b can achieve similar effects to above due to the reflective film 6 and the air layers 9 and 10, and blue light 5b can be efficiently emitted to the viewing side. In the present invention, however, it is not required to provide the configuration in which the top and bottom of the diffusion layer 3b are sandwiched by the air layers 9 and 10.

It is preferable that the plurality of phosphor patterns 3 do not have light scattering characteristics. With this configuration, the phosphor patterns 3 can efficiently emit their own light to the outside.

It is preferable that the plurality of phosphor patterns 3 be transparent members. With these types of phosphor patterns 3, it is possible to form phosphor patterns with organic phosphor members or nanophosphors, for example. If the phosphor patterns 3 are transparent members, the light emitted therein can be efficiently emitted to the outside.

As shown in FIG. 1, it is preferable that the reflective film 6 be tilted towards the transparent substrate 1 as seen from the center of the phosphor patterns 3. With this configuration, the light reflected by the reflective film 6 progresses towards the transparent substrate 1 and the light can more easily exit from the transparent substrate 1 side.

The characteristics will change depending on what degree the angle of the tilt of the reflective film 6 is set with respect to the main surface 1a of the transparent substrate 1. If the angle of the tilt of the reflective film 6 to the main surface 1a is small, then the light progressing through the phosphor patterns 3 has an increased probability of exiting towards the viewing side with only a small number of reflections. Conversely, if the angle of tilt of the reflective film 6 to the main surface 1a is large, then there is an increased probability that the light progressing through the phosphor patterns 3 must be reflected a large number of times to exit towards the viewing side, but it is possible to widen the openings for receiving the light of the phosphor patterns 3 in the respective pixels; therefore, light use efficiency can be further increased.

Figure 3:
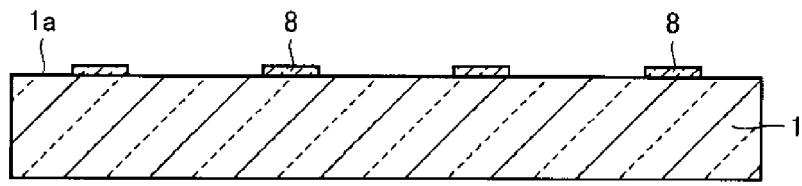
FIG. 3 is a cross-sectional view of a first step of a manufacturing process for the color conversion substrate.

A method of manufacturing the color conversion substrate 101 having the above-mentioned configuration will be explained. FIG. 3 is a cross-sectional view showing a first step of a manufacturing process of the color conversion substrate 101 according to Embodiment 1. In this first step, first, the transparent substrate 1 having the main surface 1a as shown in FIG. 3 is prepared. In general, a glass substrate having a refractive index of 1.52 is used as the transparent substrate 1. Material to form the plurality of spacers 8 is formed on the main surface 1a of the transparent substrate 1. A transparent resin material is coated onto the main surface 1a and patterned by exposure to light. The pattern is slits that are vertical or horizontal with respect to the phosphor patterns 3 and diffusion layer 3b. In Embodiment 1, as shown in FIG. 3, patterns that extend perpendicular to the surface of the paper are formed.

Figure 4:
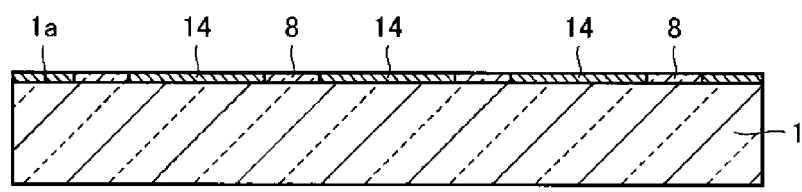
FIG. 4 is a cross-sectional view of a step after the manufacturing step in FIG. 3.

FIG. 4 is a cross-sectional view of a step after the manufacturing step in FIG. 3. In the step shown in FIG. 4, a sacrificial layer 14 is formed on the main surface 1a of the transparent substrate 1 where the material for forming the spacers 8 is not patterned. The sacrificial layer 14 is formed between respective adjacent pairs of the spacers 8 on the main surface 1a. The sacrificial layer 14a is a material that can be wet etched with an acid or alkali, such as aluminum, for example.

The material for forming the sacrificial layer 14 is coated onto the main surface 1a and the spacers 8 and then a resist is coated onto this material. Thereafter, the material of the sacrificial layer 14 overlapping the material for forming the spacers 8 is removed by exposure to light and etching. This results in the spacers 8 and the sacrificial layer 14 being alternately formed on the main surface 1a of the transparent substrate 1, as shown in FIG. 4.

After the manufacturing step shown in FIG. 4, the phosphor patterns 3 and the diffusion layer 3b are patterned on colored portions. Examples of methods for patterning include photolithography or transcription using a mold. The photolithography method will be described with reference to FIGS. 5 to 10, and the transcription with a mold method will be described with reference to FIGS. 11 to 15.

Figure 5:
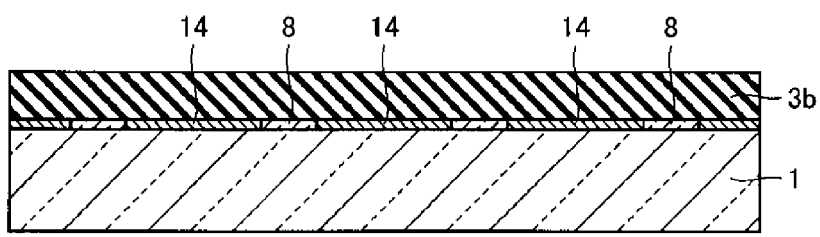
FIG. 5 is a cross-sectional view of a first example of a step after the manufacturing step shown in FIG. 4.
Figure 6:
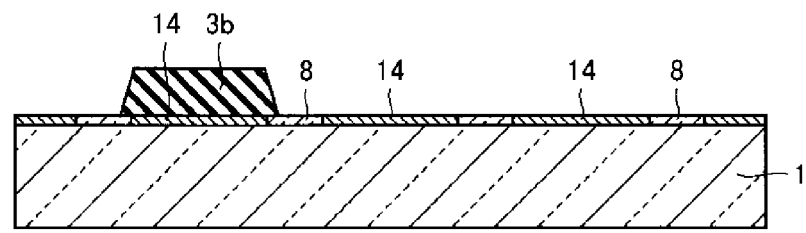
FIG. 6 is a cross-sectional view of a step after the manufacturing step in FIG. 5.

FIG. 5 is a cross-sectional view of a first example of a step after the manufacturing step shown in FIG. 4. In the photolithography method, first a negative diffusion material for forming the diffusion layer 3b is coated onto the spacers 8 formed in the step shown in FIG. 4 and the sacrificial layer 14. FIG. 6 is a cross-sectional view of a step after the manufacturing step in FIG. 5. A mask is used on the diffusion material coated in the step shown in FIG. 5, and portions of the diffusion layer 3b that will remain are exposed to light. This patterns the diffusion material and forms the diffusion layer 3b shown in FIG. 6, which covers the sacrificial layer 14 and has the periphery thereof disposed on the spacers 8.

Figure 7:
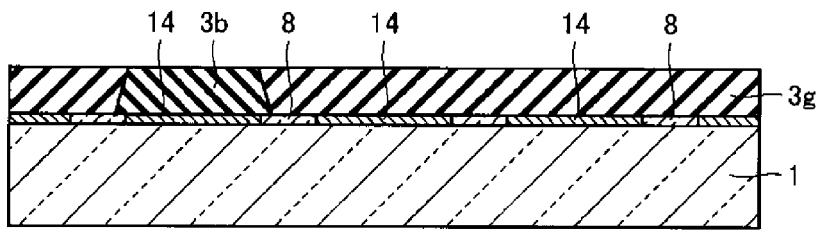
FIG. 7 is a cross-sectional view of a step after the manufacturing step in FIG. 6.
Figure 8:
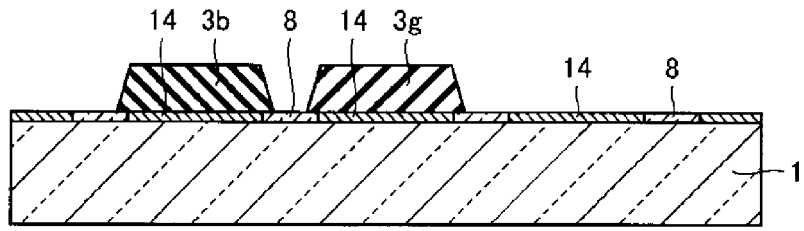
FIG. 8 is a cross-sectional view of a step after the manufacturing step in FIG. 7.

FIG. 7 is a cross-sectional view of a step after the manufacturing step in FIG. 6. A negative green phosphor material for forming the green phosphor pattern 3g is coated onto the diffusion layer 3b formed in the step shown in FIG. 6 and the spacers 8 and the sacrificial layer 14. FIG. 8 is a cross-sectional view of a step after the manufacturing step in FIG. 7. A mask is used on the green phosphor material coated in the step shown in FIG. 7, and portions of the green phosphor pattern 3g that will remain are exposed to light. This patterns the green phosphor material and forms the green phosphor pattern 3g shown in FIG. 8, which covers the sacrificial layer 14 and has the periphery thereof disposed on the spacers 8.

Figure 9:
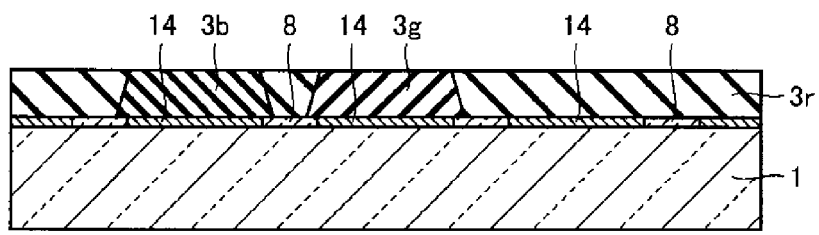
FIG. 9 is a cross-sectional view of a step after the manufacturing step in FIG. 8.
Figure 10:
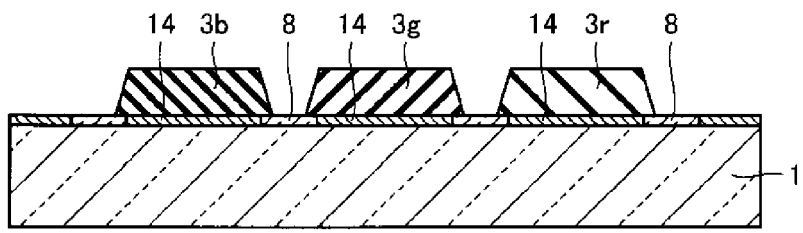
FIG. 10 is a cross-sectional view of a step after the manufacturing step in FIG. 9.

FIG. 9 is a cross-sectional view of a step after the manufacturing step in FIG. 8. A negative red phosphor material for forming the red phosphor pattern 3r is coated onto the green phosphor pattern 3g formed in the step shown in FIG. 8 and the diffusion layer 3b, the spacers 8, and the sacrificial layer 14. FIG. 10 is a cross-sectional view of a step after the manufacturing step in FIG. 9. A mask is used on the red phosphor material coated in the step shown in FIG. 9, and portions of the red phosphor pattern 3r that will remain are exposed to light. This patterns the red phosphor material and forms the red phosphor pattern 3r shown in FIG. 10, which covers the sacrificial layer 14 and has the periphery thereof disposed on the spacers 8.

In this manner, the phosphor patterns 3 (namely, the red phosphor pattern 3r and the green phosphor pattern 3g) and the diffusion layer 3b are completed by patterning through the photolithography method.

Figure 11:
FIG. 11 is a cross-sectional view of a second example of a step after the manufacturing step shown in FIG. 4.
Figure 12:
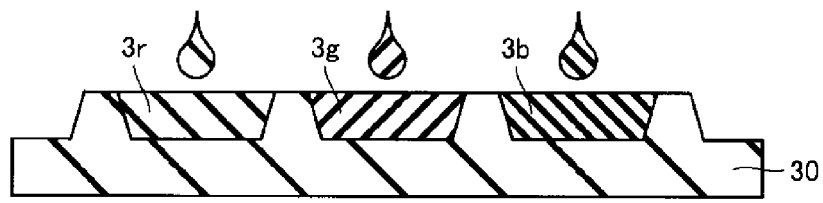
FIG. 12 is a cross-sectional view of a step after the manufacturing step in FIG. 11.

FIG. 11 is a cross-sectional view of a second example of a step after the manufacturing step in FIG. 4. In the transcription with a mold method, first a mold 30 having a shape that corresponds to the desired shape of the phosphor patterns 3 and the diffusion layer 3b is made. As shown in FIG. 11, the mold 30 has recesses that correspond to the red phosphor pattern 3r, the green phosphor pattern 3g, and the diffusion layer 3b. FIG. 12 is a cross-sectional view of a step after the manufacturing step in FIG. 11. Material is filled into the recesses of the mold 30 shown in FIG. 11 for each of the colored portions by inkjet. The adjacent three recesses in the mold 30 are coated with a forming material for the red phosphor pattern 3r, a forming material for the green phosphor pattern 3g, and a forming material for the diffusion layer 3b, in this order. Thereafter, these materials are temporarily hardened inside the recesses.

Figure 13:
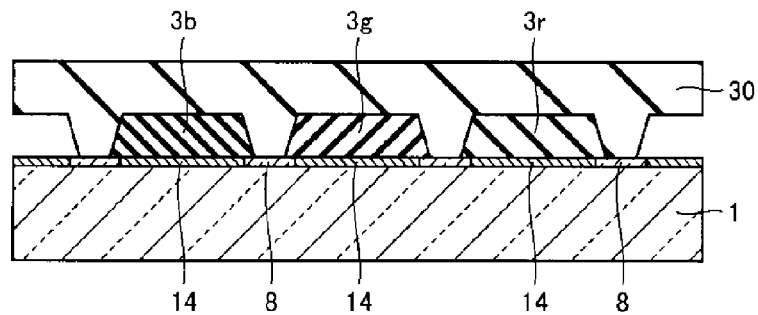
FIG. 13 is a cross-sectional view of a step after the manufacturing step in FIG. 12.

FIG. 13 is a cross-sectional view of a step after the manufacturing step in FIG. 12. The mold 30 that has had the materials for each color filled into the recesses thereof in the step shown in FIG. 12 is flipped and placed on top of the transparent substrate 1, which has the spacers 8 and the sacrificial layer 14 formed in the step shown in FIG. 4. At this time, the mold 30 is positioned on the transparent substrate 1 such that the materials for the respective colors filled into the recesses cover the sacrificial layer 14 and such that the peripheries of these materials are partially disposed on the spacers 8. The materials for the respective colors are hardened while the transparent substrate 1 and the mold 30 are combined and the materials of the respective colors are in contact with the spacers 8 and the sacrificial layer 14.

Figure 14:
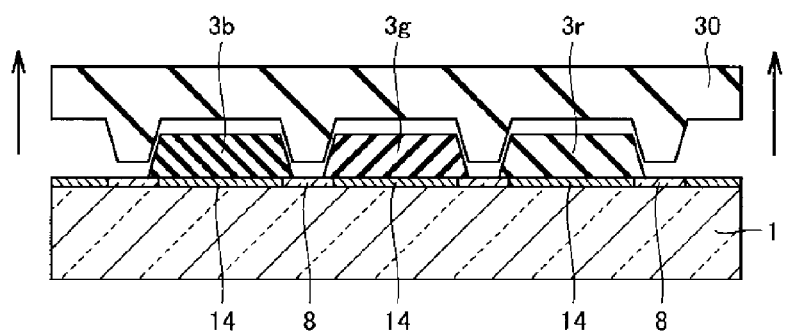
FIG. 14 is a cross-sectional view of a step after the manufacturing step in FIG. 13.
Figure 15:
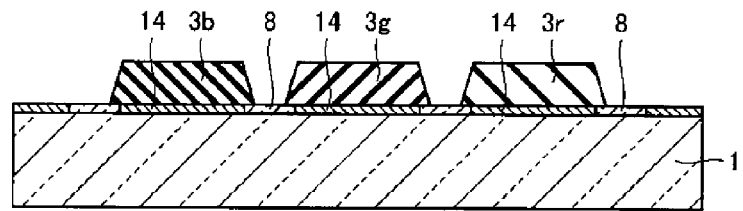
FIG. 15 is a cross-sectional view of a step after the manufacturing step in FIG. 14.

FIG. 14 is a cross-sectional view of a step after the manufacturing step in FIG. 13. After the transparent substrate 1 having the spacers 8 on the main surface 1a thereof is integrated with the phosphor patterns 3 and the diffusion layer 3b in the step shown in FIG. 13, the mold 30 is lifted off in the direction shown by the arrows in FIG. 14 and removed from the transparent substrate 1. FIG. 15 is a cross-sectional view of a step after the manufacturing step in FIG. 14. With the steps shown in FIGS. 11 to 15, the phosphor patterns 3 (namely, the red phosphor pattern 3r and the green phosphor pattern 3g) and the diffusion layer 3b are completed by patterning with the transcription with the mold 30 method.

Figure 16:
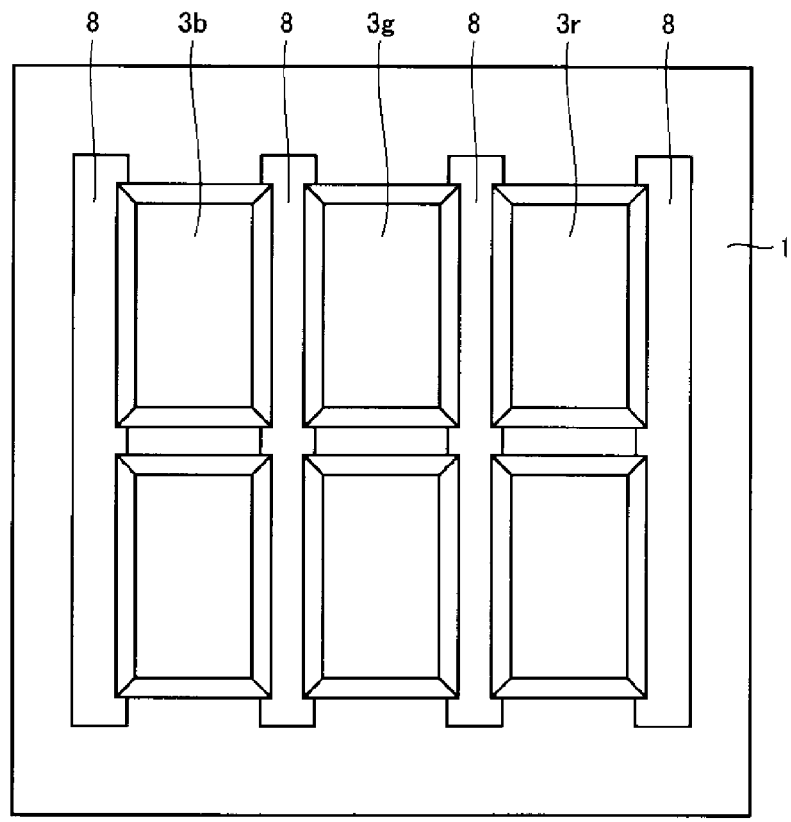
FIG. 16 is a top view of a transparent substrate after a phosphor pattern and diffusion layer have been formed.

FIG. 16 shows the top of the transparent substrate 1 after the phosphor patterns 3 and the diffusion layer 3b are formed. FIG. 16 shows a view of the transparent substrate 1 after the phosphor patterns 3 and the diffusion layer 3b has been formed as seen from the side (film surface side) where the phosphor patterns 3 and the diffusion layer 3b are formed.

As shown in FIG. 16, after the manufacturing step shown in FIG. 10 or FIG. 15, the red phosphor pattern 3r, the green phosphor pattern 3g, and the diffusion layer 3b are each patterned in a rectangular shape when viewed in the thickness direction of the transparent substrate 1. The stripe-shaped spacers 8 are formed in parallel to each other along the vertical direction in the drawing on the main surface 1a of the transparent substrate 1. The peripheries of the long-sides of the phosphor patterns 3 are placed on the spacers 8, and the peripheries of the long sides of the diffusion layer 3b are placed on the spacers 8. The spacers 8 are interposed between the main surface 1a of the transparent substrate 1 and the peripheries of the phosphor patterns 3 and the diffusion layer 3b.

Figure 17:
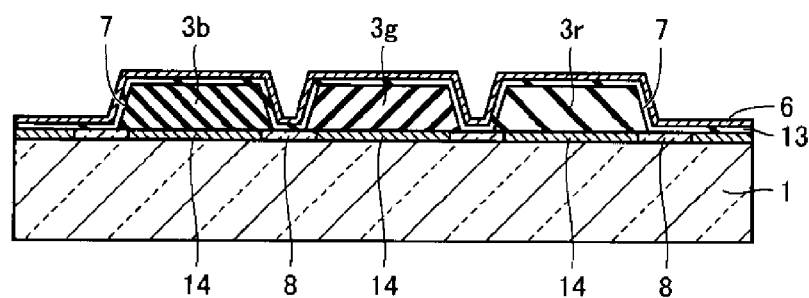
FIG. 17 is a cross-sectional view of a step after the manufacturing step in FIG. 10 or FIG. 15.

FIG. 17 is a cross-sectional view of a step after the manufacturing step in FIG. 10 or FIG. 15. As shown in FIG. 17, $SiO_2$, which is the material for forming the protective film 13, and Al, which is the material for forming the reflective film 6, are deposited by vapor deposition onto the film surface side of the transparent substrate 1 where the phosphor patterns 3 and the diffusion layer 3b are patterned. At this time, the $SiO_2$ is deposited first in order to protect the surface of the phosphor patterns 3 and the diffusion layer 3b.

Figure 18:
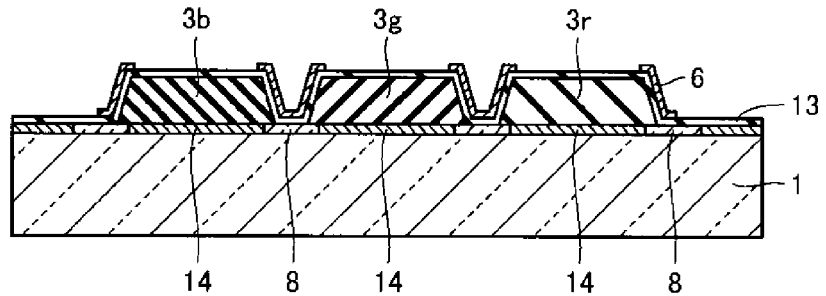
FIG. 18 is a cross-sectional view of a step after the manufacturing step in FIG. 17.

FIG. 18 is a cross-sectional view of a step after the manufacturing step in FIG. 17. The Al film formed in the step shown in FIG. 17 is exposed to light and etched to form the reflective film 6. The Al film remains on the side faces 7 of the phosphor patterns 3 and the diffusion layer 3b formed on the transparent substrate 1, and the reflective film 6 is formed on the peripheral tilted portions of the phosphor patterns 3 and the diffusion layer 3b.

Figure 19:
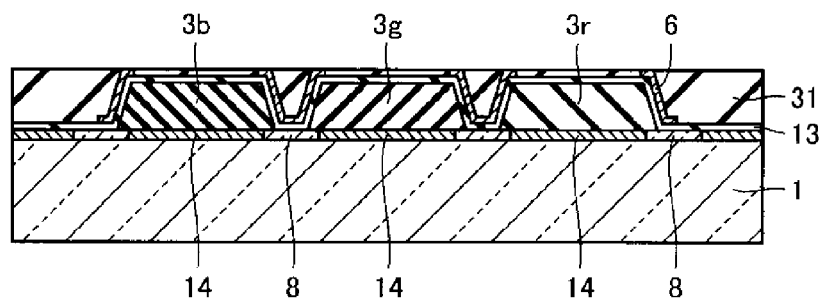
FIG. 19 is a cross-sectional view of a step after the manufacturing step in FIG. 18.
Figure 20:
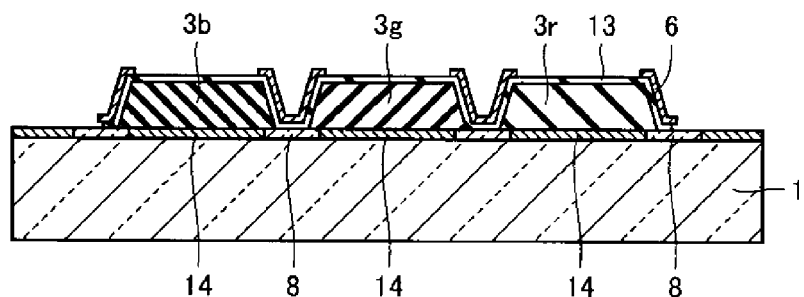
FIG. 20 is a cross-sectional view of a step after the manufacturing step in FIG. 19.

FIG. 19 is a cross-sectional view of a step after the manufacturing step in FIG. 18. In the step shown in FIG. 19, a resist material that covers the entire transparent substrate 1 is coated thereon. FIG. 20 is a cross-sectional view of a step after the manufacturing step in FIG. 19. The resist coated in the step shown in FIG. 19 remains on the phosphor patterns 3 and the diffusion layer 3b, and the rest of the $SiO_2$ film is removed by exposure to light and etching. This forms the protective film 13 and exposes the sacrificial layer 14.

Figure 21:
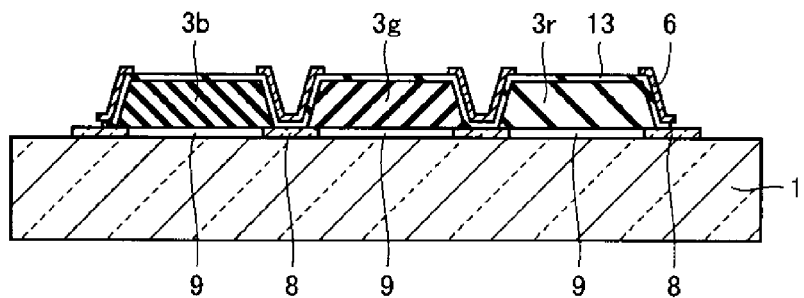
FIG. 21 is a cross-sectional view of a step after the manufacturing step in FIG. 20.

FIG. 21 is a cross-sectional view of a step after the manufacturing step in FIG. 20. In the step shown in FIG. 21, an acid or an alkali is used for wet etching to remove the sacrificial layer 14. As shown in FIG. 21, by removing the sacrificial layer 14 interposed between the main surface 1a of the transparent substrate 1 and the phosphor patterns 3, the air layers 9 are defined between the main surface 1a and the phosphor patterns 3. Removing the sacrificial layer 14 interposed between the main surface 1a of the transparent substrate 1 and the diffusion layer 3b defines the air layers 9 between the main surface 1a and the diffusion layer 3b.

The sacrificial layer 14 could also be removed by a dry-etching process, but there is not a sufficient enough difference between the etch rate of the organic material of the sacrificial layer 14 and the organic phosphors. If the selectivity caused by differences in the etch rate is not sufficient, the phosphor patterns 3 will also be etched during removal of the sacrificial layer 14, which will roughen the surface of the phosphor patterns 3, lead to a loss of film, and the like. Thus, it is necessary to form the sacrificial layer 14 with a material that can be wet etched.

Figure 22:
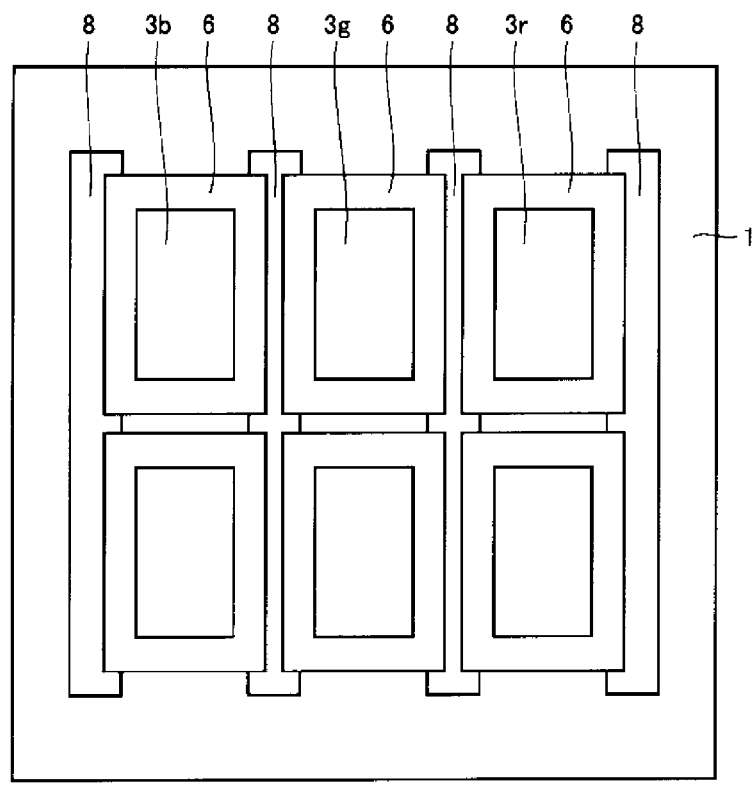
FIG. 22 is a top view of the completed color conversion substrate.

FIG. 22 is a top view of the completed color conversion substrate 101. The color conversion substrate 101 shown in FIG. 1 is completed through the respective steps described above. FIG. 22 shows the color conversion substrate 101 from the film surface side. The reflective film 6 is formed on the peripheral tilted portions of the red phosphor pattern 3r, the green phosphor pattern 3g, and the diffusion layer 3b patterned into rectangular shapes such that the reflective film surrounds these layers. The peripheries of the long-sides of the phosphor patterns 3 are disposed on the spacers 8, and the peripheries of the long sides of the diffusion layer 3b are disposed on the spacers 8.

Figure 23:
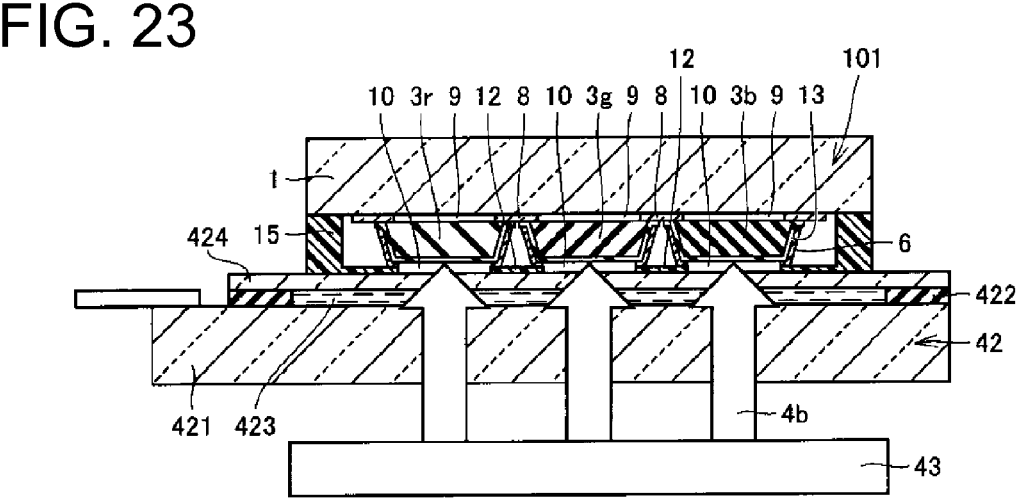
FIG. 23 is a cross-sectional view of a display device according to Embodiment 1.
Figure 24:
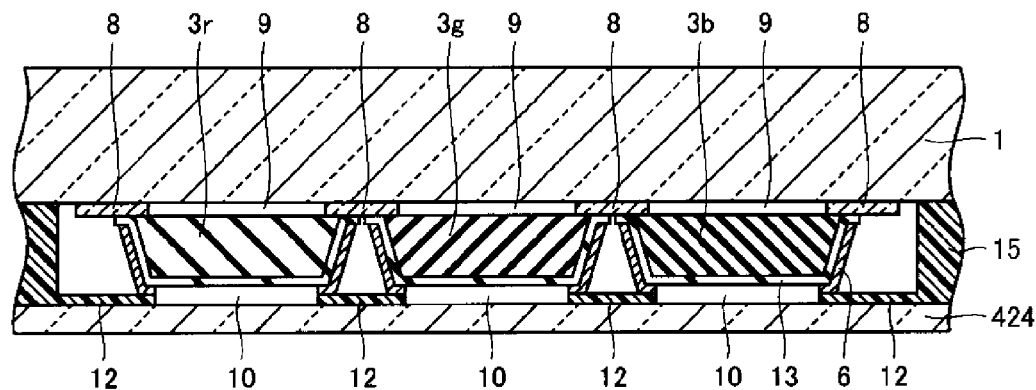
FIG. 24 is a cross-sectional view in which the area adjacent to the color conversion substrate of the display device shown in FIG. 23 has been magnified.

FIG. 23 is a cross-sectional view of a display device according to Embodiment 1. FIG. 24 is a cross-sectional view in which the area adjacent to the color conversion substrate 101 of the display device shown in FIG. 23 has been magnified. The display device of the present embodiment shown in FIGS. 23 and 24 is equipped with the color conversion substrate 101 shown in FIG. 1, or in other words, the color conversion substrate 101 made through the respective manufacturing steps shown in FIGS. 3 to 22. The display device has a blue light source 43 disposed overlapping the color conversion substrate 101 so as to emit light towards the color conversion substrate 101 and illuminate the color conversion substrate 101, and also has a light shutter 42 disposed between the color conversion substrate 101 and the blue light source 43.

The blue light source 43 is a surface-emitting unit. The blue light source 43 has a light guide plate and blue LEDs that illuminate the side faces of the light guide plate. The blue light source 43 may be an edge-lit backlight that illuminates the color conversion substrate 101 by the light emitted by the blue LEDs passing through the light guide plate. The blue light source 43 may be a direct-lit backlight without a light guide plate but instead having a plurality of blue LEDs arranged in a flat array. In such a case, it is preferable that a diffusion plate be disposed between the blue LEDs and the color conversion substrate 101. The blue light source 43 may have an organic EL panel or an inorganic EL panel that emits blue light.

The blue light source 43 emits substantially parallel blue light 4b. The wavelength region of the blue light 4b emitted by the blue light source 43 is 390 nm to 510 nm, for example. The wavelength in which the intensity of the blue light 4b is highest is approximately 450 nm, for example.

The light shutter 42 is a device that controls whether light passes through the respective pixels or not in accordance with some type of operating principle, and selectively blocks a portion of the blue light 4b emitted from the blue light source 43 while selectively allowing a portion of the blue light 4b to enter the color conversion substrate 101. The light shutter 42 is positioned so as to correspond to the color conversion substrate 101. "Positioned so as to correspond" means that, if the light shutter 42 has a plurality of pixels, for example, the light shutter 42 is positioned such that the respective phosphor patterns 3 on the color conversion substrate 101 correspond to the respective pixels of the light shutter 42. This also means that if the color conversion substrate 101 has a diffusion layer or a transparent layer, in addition to the phosphor patterns 3, for scattering blue light or allowing blue light to pass through, this diffusion layer or transparent layer corresponds to the respective pixels of the light shutter 42.

A liquid crystal display panel can be used as the light shutter 42. In this case, as shown in FIG. 23, the light shutter 42 includes a glass substrate 421 that is a TFT (thin film transistor) substrate disposed on the blue light source 43 side, a glass substrate 424 that is an opposite substrate disposed on the color conversion substrate 101 side, a liquid crystal layer 423 sealed between the glass substrate 421 and the glass substrate 424, and a sealing member 422 that seals the liquid crystal layer 423.

Source bus lines are formed on the surface of the glass substrate 421 on the liquid crystal layer 423 side, and an insulating layer is formed to cover these source bus lines. Pixel electrodes are arranged on the surface of the insulating layer so as to correspond to the respective pixels. An opposite electrode is formed on the surface of the glass substrate 424 on the liquid crystal layer side 423. Polarizing plates are respectively attached to the outer surfaces of the glass substrates 421 and 424.

A voltage is applied between the pixel electrodes on the glass substrate 421 side and the opposite electrode on the glass substrate 424 side to change the molecular orientation of the liquid crystal layer 423 with respect to the pixels. The light shutter 42 controls the transmittance of light of the pixels through a combination of changes in the polarized light state of the liquid crystal layer 423 and the polarizing plates.

The sealing member 422 is formed in a looped shape along the outer peripheries of the glass substrate 421 and the glass substrate 424, and this sealing member 422 seals the liquid crystal layer 423 between the glass substrate 421 and the glass substrate 424.

The light shutter 42 and the color conversion substrate 101 are connected to each other by a connection member 15. Specifically, the connection member 15 is disposed so as to be sandwiched between the glass substrate 424 and the transparent substrate 1, and the glass substrate 424 and the transparent substrate 1 are integrally fixed to each other via the connection member 15. The phosphor patterns 3 and the diffusion layer 3b are arranged in the empty space defined by the glass substrate 424 and the transparent substrate 1 through providing the connection member 15.

As shown in FIG. 24, light source-side spacers 12 are sandwiched between the reflective film 6 that surrounds the side faces 7 of the phosphor patterns 3 and the diffusion layer 3b and the glass substrate 424. The light source-side spacers 12 are interposed between the light shutter 42 and the periphery of the phosphor patterns 3 and the light shutter 42 and the diffusion layer 3b. The light source-side spacers 12 are formed into a black matrix. In order for the excitation light in the phosphor patterns 3 to be diffused and for no light to leak to the adjacent pixels, a black matrix is formed on the borders of the phosphor patterns corresponding to the different pixels in order to shield the boundaries of the respective pixels from light.

By providing these light source-side spacers 12, the air layers 10, which are light source-side air layers, are defined between the light shutter 42 and the phosphor patterns 3, and the air layers 10 are defined between the light shutter 42 and the diffusion layer 3b. The blue light 4b that is emitted from the blue light source 43 and enters the color conversion substrate 101 via the light shutter 42 passes through the air layers 10 and enters the phosphor patterns 3 or the diffusion layer 3b from the openings in the reflective film 6. The thickness of the light source-side spacers 12 is approximately 1 µm in order to have a thickness that makes it easy for the refractive index of the air layers 10 to be expressed.

Figure 25:
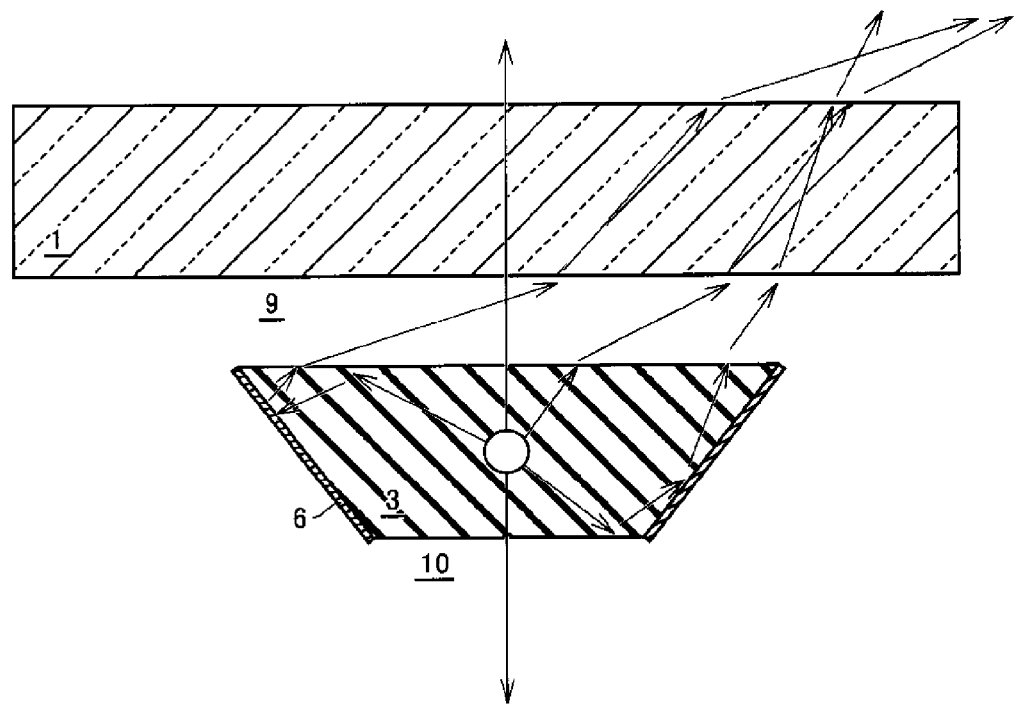
FIG. 25 is a view for explaining the progression of light that is refracted or reflected by an air layer.

FIG. 25 is a view for explaining the progression of light that is refracted or reflected by the air layers 9 and 10. The air layers 10 are located on the light entering side of the phosphor patterns 3 (the side facing the light shutter 42, or namely, the light source side), and the air layers 9 are located on the exiting side of the phosphor patterns 3 (the side facing the transparent substrate 1, or namely, the viewing side). The blue light 4b that passes through the light shutter 42 and enters the phosphor patterns 3 becomes excited in the phosphor patterns 3 and is converted into a desired color. The excited phosphors emit light that has a Lambertian distribution, or namely, that is non-directional, and this light scatters isotropically.

The refractive index of the phosphor patterns 3 is typically approximately 1.5. Meanwhile, the refractive index of the air layers 9 and 10 is 1.0. The refractive index of the air layers 9 and 10 is lower than the refractive index of the phosphor patterns 3, and the air layers 9 and 10 are low refractive index layers that have a relatively lower refractive index as compared to the phosphor patterns 3.

A portion of the non-directional light emitted by the phosphor patterns 3 progresses towards the air layers 9. If the incident angle of the light is smaller than a critical angle at the interface of the phosphor patterns 3 and the air layers 9, the light is refracted at the interface and enters the air layers 9 and then enters the transparent substrate 1 from the air layers 9, and thereafter this light exits to outside from the exiting surface of the transparent substrate 1.

If the incident angle of the light is larger than a critical angle at the interface of the phosphor patterns 3 and the air layers 9, the light is reflected at the interface. Thereafter, the light is reflected at the reflective film 6 and again progresses towards the interface of the phosphor patterns 3 and the air layers 9. If the incident angle of this light on the interface at this time is smaller than the critical angle, then the light enters the air layers 9, passes through the air layers 9 to the transparent substrate 1, and thereafter exits outside from the exiting surface of the transparent substrate 1.

A portion of the light generated by the phosphor patterns 3 progresses towards the reflective film 6. Thereafter, the light is reflected by the reflective film 6. The reflective film 6 is tilted along the side faces 7 of the phosphor patterns 3, and thus the light reflected by the reflective film 6 progresses towards the air layers 9.

A portion of the light generated by the phosphor patterns 3 progresses towards the air layers 10, but if the incident angle of the light is larger than the critical angle of the interface of the phosphor patterns 3 and the air layers 10, then this light will be reflected at the interface. Therefore, phosphor that is generated by the phosphor patterns 3 can be suppressed from being emitted towards the light shutter 42. Due to this, light use efficiency is improved. The light reflected at the interface of the phosphor patterns 3 and the air layers 3 then progresses towards the air layers 9 or the reflective film 6. The light that progresses towards the reflective film 6 is reflected at the reflective film 6 and progresses towards the air layers 9.

When light that is reflected at least once at the interface of the phosphor patterns 3 and the air layers 9 and 10 and/or by the reflective film 6 is incident on the interface of the phosphor patterns 3 and the air layers 9, if the incident angle of the light is smaller than the critical angle of the interface of the phosphor patterns 3 and the air layers 9, the light enters the air layers 9, passes through the air layers 9 to the transparent substrate 1, and then exits to outside from the exiting surface of the transparent substrate 1. The light reflected at the interface of the air layers 9 and 10 and/or by the reflective film 6 has the angle thereof changed and then progresses towards the air layers 9, which causes the light to be emitted from the phosphor patterns 3 and contribute to display. Due to this, light use efficiency is improved.

The air layers 9 are defined between the phosphor patterns 3 and the transparent substrate 1, and the phosphor patterns 3 and the transparent layer 1 have approximately the same refractive index. Therefore, it is possible to suppress light that enters the transparent substrate 1 through the air layers 9 from the phosphor patterns 3 being totally reflected at the exit surface of the transparent substrate 1 and exiting to the outside, and thus not contributing to the display of the display device.

In other words, among the light traveling towards the interface of the phosphor patterns 3 and the air layers 9, the light that enters the interface at an incident angle that is at least the critical angle of the interface of the phosphor patterns 3 and the air layers 9 is totally reflected by this interface and does not exit from the phosphor patterns 3. The light that passes through the air layers 9 to enter the transparent substrate 1 enters the transparent substrate 1 at an incident angle that is smaller than the critical angle of the interface of the phosphor patterns 3 and the air layers 9. Therefore, the incident angle of the light progressing to the exiting surface of the transparent substrate 1 becomes smaller than the critical angle of the exiting surface. If the incident angle of the light is smaller than the critical angle of the exiting surface, then the light will not be totally reflected at the exiting surface of the transparent substrate 1.

In other words, the light that progresses towards the exiting surface at an incident angle that results in the light being totally reflected by the exiting surface of the transparent substrate 1 will be totally reflected at the interface of the phosphor patterns 3 and the air layers 9, and will not reach the transparent substrate 1. Accordingly, among the light generated by the phosphor patterns 3, more light can be emitted to the outside from the display device, which makes it possible to further improve light use efficiency.

Providing the air layers 9 and 10 as low refractive index layers on the light entering and light exiting sides of the phosphor patterns 3 allows for light use efficiency to be improved by lowering the refractive index of the low refractive index layers, and can also reduce the number of components of the display device, thereby reducing costs. It can also widen the viewing angles of the display device.

The effects of the display device of the present embodiment will be explained. The blue light 4b emitted from the blue light source 43 is controlled so as to be allowed to pass or not pass through the respective pixels by the light shutter 42 or so that a prescribed amount of light is allowed to pass or not pass through; therefore, after the light has passed through the light shutter 42, the prescribed amount of blue light 4b for each pixel goes through the respective pixels. In this manner, a prescribed amount of the blue light 4b enters into the plurality of phosphor patterns 3 and the diffusion layer 3b.

If the blue light 4b has entered any of the phosphor patterns 3r and 3g, the phosphor pattern will be excited by the blue light 4b and emit red light or green light to the viewing side. If the blue light 4b has entered the diffusion layer 3b, the blue light 4b is scattered and is emitted towards the viewing side as blue light. In this manner, only properly processed light is emitted to the respective pixels, thus allowing for color display.

In the conversion substrate 101 of the display device of the present embodiment, the air layers 9 and 10, which are low refractive index layers, sandwich the phosphor patterns 3; therefore, light use efficiency is increased. Accordingly, a display device that has a high light use efficiency can be obtained.

(Embodiment 2)

Figure 26:
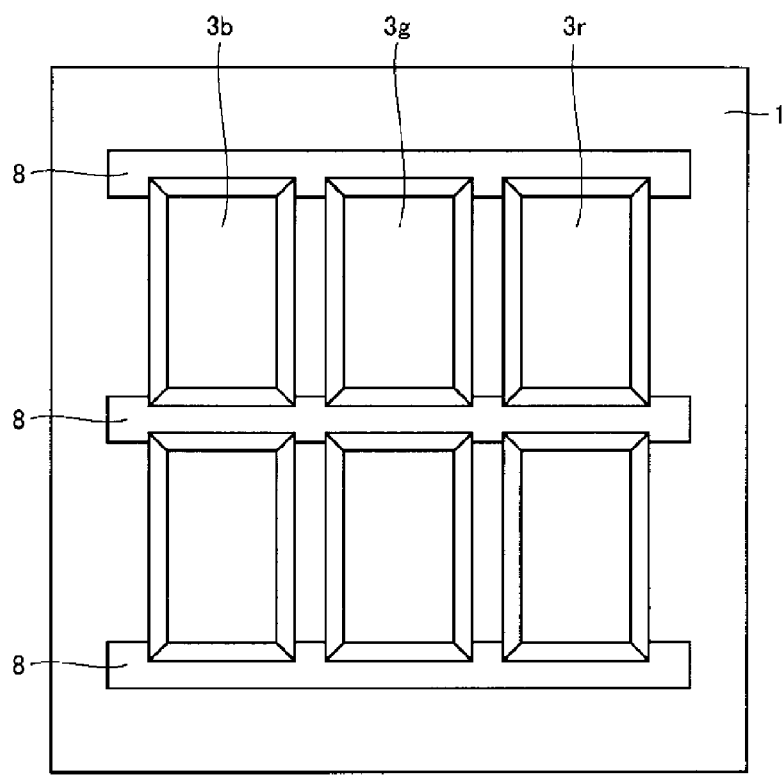
FIG. 26 is a top view of a transparent substrate after a phosphor pattern and diffusion layer have been formed in Embodiment 2.
Figure 27:
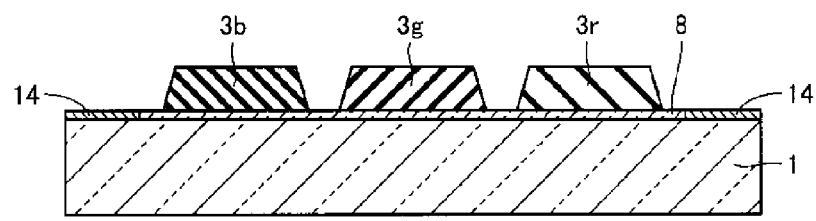
FIG. 27 is a cross-sectional view of the transparent substrate in FIG. 26.
Figure 28:
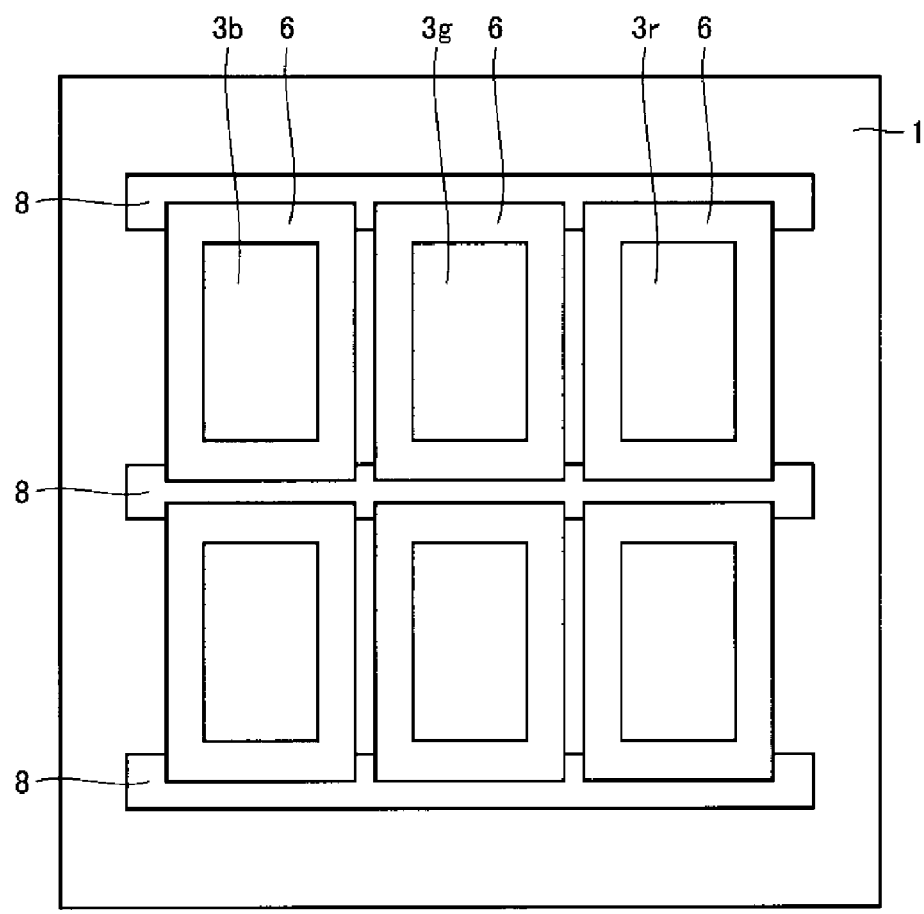
FIG. 28 is a top view of a completed color conversion substrate in Embodiment 2.

FIG. 26 is a view of the top of a transparent substrate 1 after phosphor patterns 3 and a diffusion layer 3b of Embodiment 2 have been formed. FIG. 27 is a cross-sectional view of the transparent substrate 1 in FIG. 26. FIG. 28 is a view of the top of a completed color conversion substrate 101 according to Embodiment 2. Embodiment 2 differs from Embodiment 1 in that the color conversion substrate 101 of Embodiment 2 has the peripheries of short sides of the phosphor patterns 3 and the diffusion layer 3b, which are patterned into a rectangular shape, placed on spacers 8, and these spacers 8 support the peripheries of the short sides of the phosphor patterns 3 and the diffusion layer 3b.

Even with this configuration, the color conversion substrate 101 can achieve similar effects that are able to improve light use efficiency, in a manner similar to Embodiment 1. The difference in arrangement of the spacers 8 changes the openings facing the exiting side of the phosphor patterns 3 and the diffusion layer 3b, and the aperture ratio is larger than in Embodiment 1. The change in the openings makes it possible to relatively increase the light going from the phosphor patterns 3 and the diffusion layer 3b to the exiting side.

(Embodiment 3)

Figure 29:
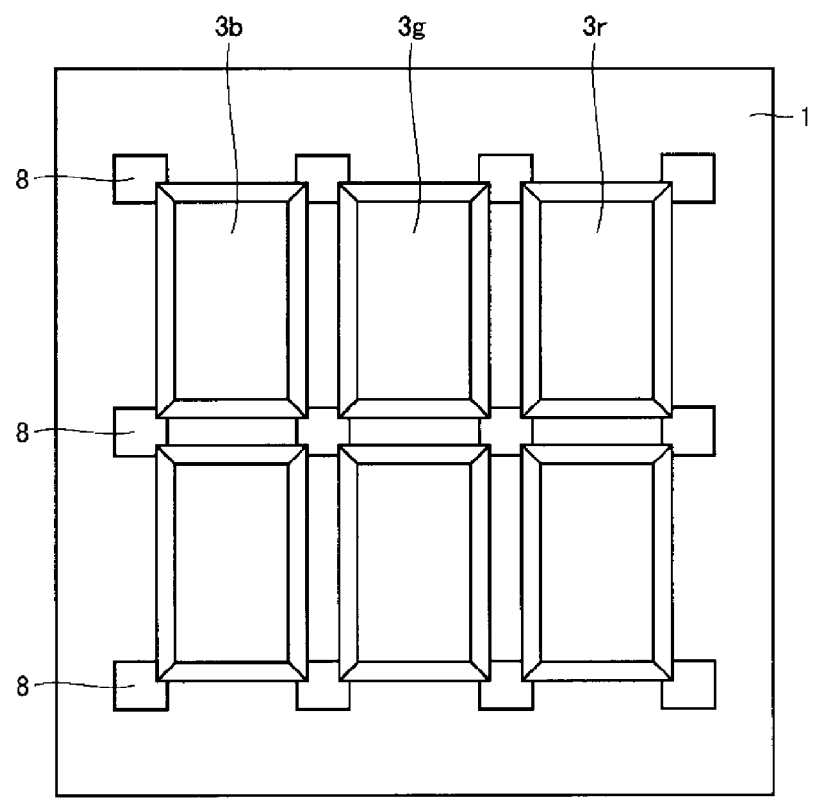
FIG. 29 is a top view of a transparent substrate after a phosphor pattern and diffusion layer have been formed in Embodiment 3.
Figure 30:
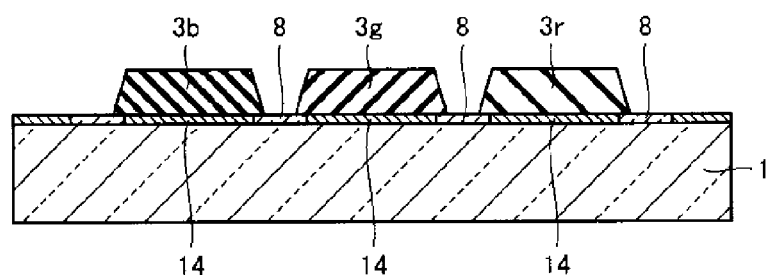
FIG. 30 is a cross-sectional view of the transparent substrate in FIG. 29.
Figure 31:
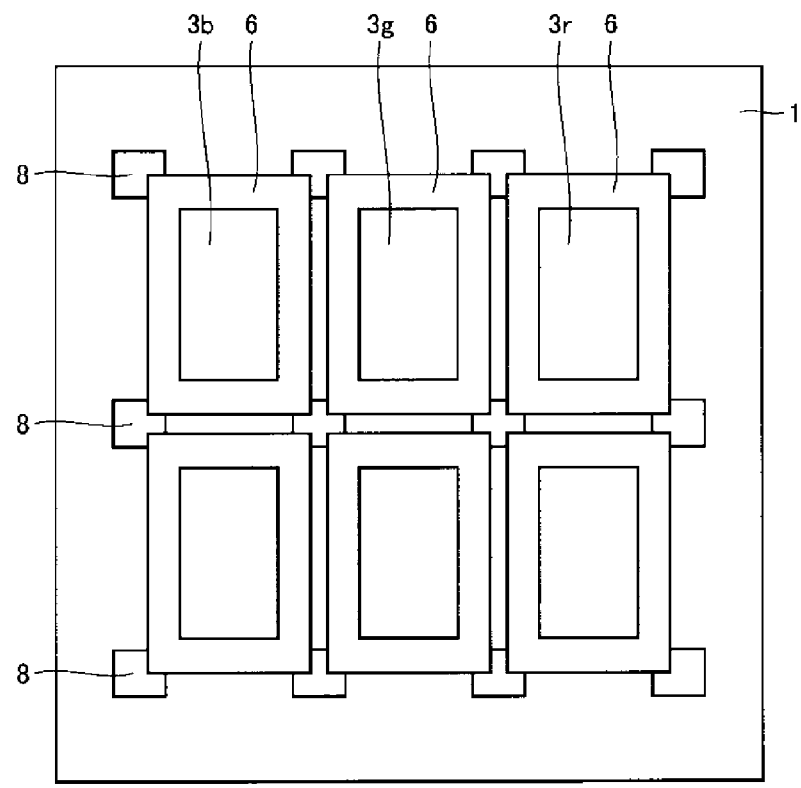
FIG. 31 is a top view of a completed color conversion substrate in Embodiment 3.
Figure 32:
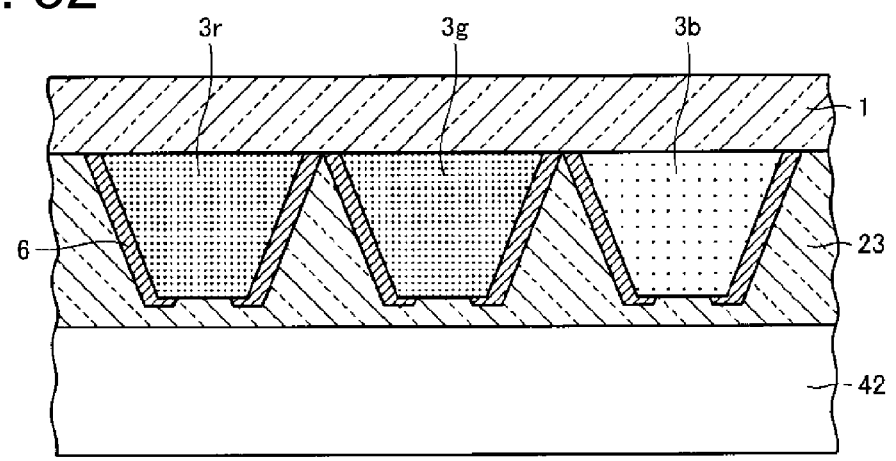
FIG. 32 is a cross-sectional view of a configuration based on conventional technology.
Figure 33:
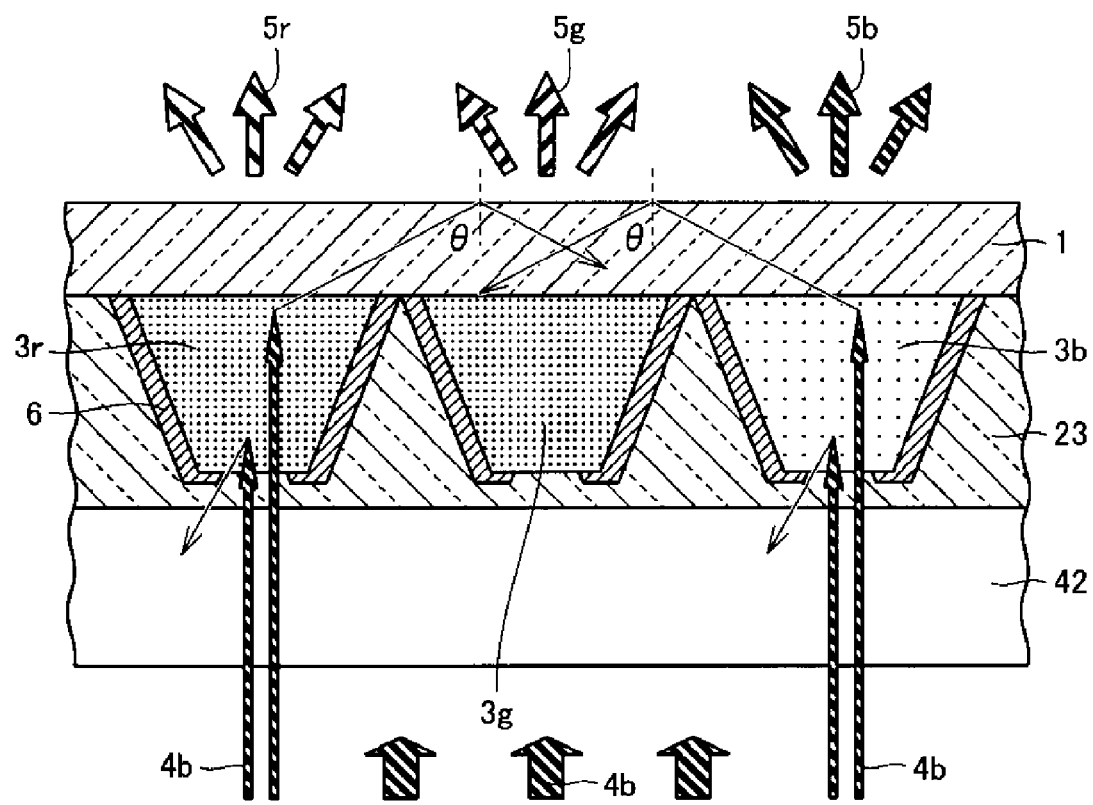
FIG. 33 is a view for explaining the progression of light in the configuration based on conventional technology.

FIG. 29 is a view of the top of a transparent substrate 1 after phosphor patterns 3 and a diffusion layer 3b of Embodiment 3 have been formed. FIG. 30 is a cross-sectional view of the transparent substrate 1 in FIG. 29. FIG. 31 is a view of the top of a completed color conversion substrate 101 according to Embodiment 3. Embodiment 3 differs from Embodiments 1 and 2 in that the color conversion substrate 101 of Embodiment 3 has the peripheries of corners of the phosphor patterns 3 and the diffusion layer 3b, which are patterned into a rectangular shape, placed on spacers 8, and these spacers 8 support the peripheries of the corners of the phosphor patterns 3 and the diffusion layer 3b.

Even with this configuration, the color conversion substrate 101 can achieve similar effects that are able to improve light use efficiency, in a manner similar to Embodiments 1 and 2. The difference in arrangement of the spacers 8 changes the openings facing the exiting side of the phosphor patterns 3 and the diffusion layer 3b, and the aperture ratio is even larger than in Embodiment 2. The change in the openings makes it possible to relatively increase the light going from the phosphor patterns 3 and the diffusion layer 3b to the exiting side.

Embodiments of the present invention were described above, but the described embodiments are examples in every respective and shall not be construed as limiting. The scope of the present invention is defined not by the explanations above, but by the claims, and all modifications with the same meaning as the claims and within the scope defined thereby are included.

DESCRIPTION OF REFERENCE CHARACTERS

1 transparent substrate
1a main surface
3 phosphor pattern
3b diffusion layer
3g green phosphor pattern
3r red phosphor pattern
4b, 5b blue light
5g green light
5r red light
6 reflective film
7 side face
8 spacer
9, 10 air layer
12 light source side-spacer
13 protective film
14 sacrificial layer
15 connection member
30 mold
42 light shutter
43 blue light source
101 color conversion substrate
421, 424 glass substrate
422 sealing member
423 liquid crystal layer

What is claimed is:

1. A color conversion substrate, comprising:
a transparent substrate having a main surface;
a plurality of phosphor patterns arranged and supported on the main surface of the transparent substrate such that an air layer is defined therebetween, each of said phosphor patterns having side faces; and
a reflective film that reflects light and that is formed on at least said side faces of the phosphor patterns,
wherein the main surface of the transparent substrate and the plurality of phosphor patterns are configured such that a surface of each of the phosphor patterns facing the transparent substrate is exposed to said air layer.

2. The color conversion substrate according to claim 1, further comprising:
spacers interposed between the main surface of the transparent substrate and peripheries of the phosphor patterns.

3. The color conversion substrate according to claim 2, wherein the spacers are made of a transparent resin material.

4. A display device, comprising:
the color conversion substrate according to claim 3;
a light source configured to illuminate the color conversion substrate; and
a light shutter disposed between the color conversion substrate and the light source,
wherein the light shutter supports the color conversion substrate such that an air layer is defined therebetween and such that another surface of each of the phosphor patterns is exposed to said air layer.

5. The display device according to claim 4, further comprising: spacers interposed between the light shutter and the phosphor patterns so as to correspond to edges of the phosphor patterns.

6. The display device according to claim 5, wherein said spacers interposed between the light shutter and the phosphor patterns form a black matrix.

7. The display device according to claim 4, wherein the light source is a blue light emitting diode configured to emit blue light.

8. The display device according to claim 4, wherein the light shutter is a liquid crystal display panel.

9. A display device, comprising:
the color conversion substrate according to claim 1;
a light source configured to illuminate the color conversion substrate; and
a light shutter disposed between the color conversion substrate and the light source,
wherein the light shutter supports the color conversion substrate such that an air layer is defined therebetween and such that another surface of each of the phosphor patterns is exposed to said air layer.

10. The display device according to claim 9, further comprising: spacers interposed between the light shutter and the phosphor patterns so as to correspond to edges of the phosphor patterns.

11. The display device according to claim 10, wherein said spacers interposed between the light shutter and the phosphor patterns form a black matrix.

12. The display device according to claim 9, wherein the light source is a blue light emitting diode configured to emit blue light.

13. The display device according to claim 9, wherein the light shutter is a liquid crystal display panel.

14. A method of manufacturing a color conversion substrate, comprising:
preparing a transparent substrate having a main surface;
forming a plurality of spacers on the main surface of the transparent substrate;

forming a sacrificial layer between adjacent pairs of the spacers on the main surface of the transparent substrate;

forming phosphor patterns that cover the sacrificial layer and have peripheries thereof that are disposed on the spacers; and removing the sacrificial layer.

15. The method of manufacturing a color conversion substrate according to claim 14, wherein the sacrificial layer is made of a material that can be removed by wet etching with an acid or an alkali.

16. The method of manufacturing a color conversion substrate according to claim 15, wherein the step of removing the sacrificial layer includes defining an air layer between the main surface of the transparent substrate and the phosphor patterns such that a surface of each of the phosphor patterns facing the transparent substrate is exposed to said air layer.

17. The method of manufacturing a color conversion substrate according to claim 14, wherein the step of removing the sacrificial layer includes defining an air layer between the main surface of the transparent substrate and the phosphor patterns such that a surface of each of the phosphor patterns facing the transparent substrate is exposed to said air layer.

* * * * *